United States Patent [19]

Blad et al.

[11] Patent Number: 4,842,725

[45] Date of Patent: Jun. 27, 1989

[54] ASSEMBLY FOR MAKING UP UNTREATED WATER ACCORDING TO THE PRINCIPLE OF REVERSE OSMOSIS

[75] Inventors: Thomas Blad; Mogens Ellegaard; Niels D. Jensen, all of Bjerringbro, Denmark

[73] Assignee: Grundfos International A/S, Bjerringbro, Denmark

[21] Appl. No.: 204,673

[22] Filed: Jun. 9, 1988

[30] Foreign Application Priority Data

Jun. 10, 1987 [DE] Fed. Rep. of Germany ....... 3719292

[51] Int. Cl.$^4$ ............................................ B01D 13/00
[52] U.S. Cl. ................................ 210/137; 210/321.66; 210/416.1
[58] Field of Search ................ 210/137, 321.66, 416.1, 210/321.63

[56] References Cited

U.S. PATENT DOCUMENTS 4,321,137  3/1982  Kohler ...................... 210/416.1 X
4,770,770  9/1988  Regunathan et al. ..... 210/321.66 X Primary Examiner—Frank Spear
Attorney, Agent, or Firm—Michael N. Meller

[57] ABSTRACT

The inventive assembly comprises a driven feed pump fed with untreated water, and a water circuit connected thereto with a driven circulation pump and a reverse osmosis unit, wherefrom subsequent to the reverse osmosis treatment part of the water is available as pure water whereas the remaining part leaves the reverse osmosis unit in form of concentrated untreated water and is at least partially returned to the circulation pump.

In order to render such an assembly more compact and less expensive in production the feed pump and the circulation pump are arranged on a common shaft driven by one motor.

Such an assembly is preferably used in private homes.

11 Claims, 2 Drawing Sheets

ASSEMBLY FOR MAKING UP UNTREATED WATER ACCORDING TO THE PRINCIPLE OF REVERSE OSMOSIS

FIELD OF THE INVENTION

The invention relates to an assembly for making up untreated water by removing undesirable materials according to the principle of reverse osmosis, said assembly comprising a driven feed pump feed with untreated water, and a water circuit connected thereto with a driven circulation pump, where the pressure of the delivered untreated water is increased above the osmotic pressure, and a reverse osmosis unit, wherefrom subsequent to the reverse osmosis treatment part of the water is available as pure water whereas the remaining part leaves the reverse osmosis unit in form of concentrated untreated water and is at least partially returned to the circulation pump.

BACKGROUND ART

Ground water for the preparation of water for industrial and/or domestic use distributed by public utilities is increasingly contaminated with unhealthy or otherwise undesirable materials due to the growing strain the soil is subjected to, e.g. by means of over-fertilization or extensive use of herbicides, pesticides, insecticides etc. As a result, the preparation of potable domestic and/or industrial water is increasingly difficult and requires the use of additional purifying assemblies. These assemblies are known per se and operate on the principle of reverse osmosis. According to this principle the untreated or otherwise madeup water deriving from ground water is fed to the reverse osmosis unit of the assembly. One part of the water permeates the membrane of the unit and undesirable impurities are removed. This part of the water subsequently leaves the unit and is available to be used as potable domestic water. The remaining part not having permeated the membrane also leaves the unit to be used as industrial and/or domestic water for appropriate purposes. Such assemblies are designed for industrial large-scale use and result in considerable construction requirements with corresponding production costs. This is predominantly due to the two pumps being installed separately and each pump being provided with its own drive motor. Thus such assemblies are unsuitable for private use.

SUMMARY OF THE INVENTION

The object of the invention is to provided an assembly of the type mentioned above and especially suitable for private homes, where the production costs of said assembly are comparatively low.

On the basis of the above-mentioned assembly the object of the invention is accomplished by the feed pump and the circulation pump being arranged on a common shaft driven by a motor.

In a preferred embodiment of the inventive assembly the common shaft is an extension of the motor shaft, where the pumps are arranged with no space between each other and directly flanged to the motor, the feed pump facing the motor. In a further embodiment a part of the housing wall of one pump also constitutes a part of the housing wall of the other pump.

The inventive assembly is very compact, as the two pumps are arranged close to each other and require only one drive motor. As a result the space requirements for the installation of such an assembly are considerably reduced and the entire assembly can be inexpensively installed especially in private homes. Using the inventive assembly in a private home is also advantageous as only approx. 10% of the domestic water tapped from the public utility in a private home are used for purposes connected with food and drink, whereas the remaining water is used for hygienic purposes.

BRIEF DESCRIPTION OF THE DRAWINGS

The invention is described in greater detail below and with reference to the accompanying drawings, in which.

DESCRIPTION OF THE PREFERRED EMBODIMENT

Figure 1:
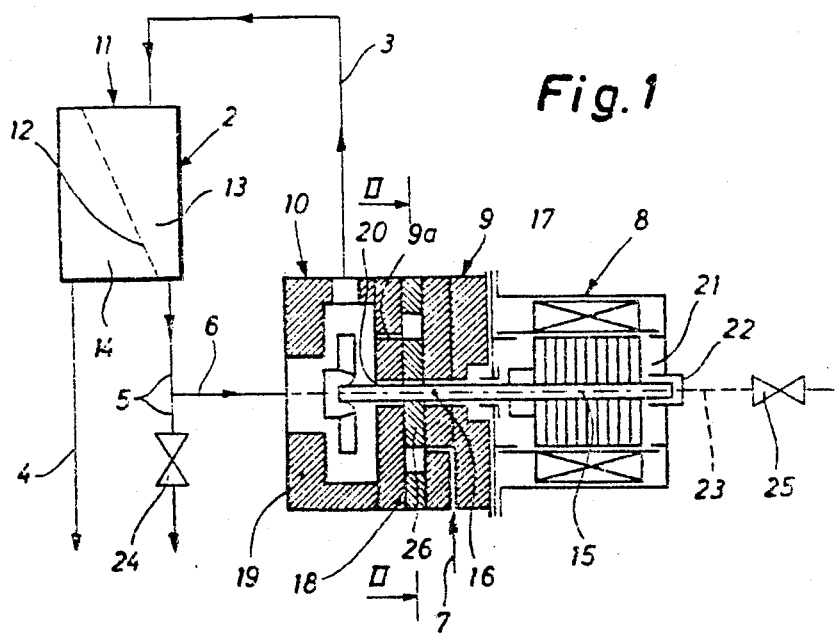
FIG. 1 is a diagrammatic, partially sectional view of an embodiment of the invention.

FIG. 1 illustrates the assembly comprising a motor-pump-unit 1, a reverse osmosis unit 2, a circulation pipe 3 connecting the two units, a first outlet pipe 4 for purified water from the unit 2, a second outlet pipe 5 for non-purified water from the unit 2, and a branch pipe 6 connecting the second outlet pipe 5 with the unit 1. The unit 1 is provided with untreated water from the public utility via an inlet pipe 7. The unit 1 comprises a motor 8, preferably a speed-adjustable, electric wet motor according to the canned motor principle, a feed pump 9, preferably a displacement pump, and a circulation pump 10, preferably a centrifugal pump. The reverse osmosis unit 2 comprises substantially a housing 11 with a membrane 12 causing reverse osmosis and separating the housing into two chambers 13 and 14.

The electric motor 8 includes a shaft 15 having an extension 16 for carrying the feed pump 9 as well as the circulation pump 10, the motor preferably facing the feed pump. For obtaining an optimally compact unit 1 the motor 8 is flanged to a part 17 of the housing of the feed pump 9. Furthermore the two pumps 9 and 10 are flanged together, as is clearly depicted in FIG. 1. A part of the housing wall of one pump can also constitute a part of the housing wall of the other pump. In the illustrated embodiment the part 18 of the housing of the pump 9 also constitutes one part of the housing wall of the pump 10, thus saving one wall in the housing 19. The three parts 8, 9 and 10 are thus arranged with no space between them and it is obvious that the motor 8 drives both pump 9 and pump 10 together.

The electric motor 8 can be cooled with a part of the water circulating in the pipes 3, 5 and 6 by means of a conventional fluid path 20 leading to a rotor chamber 21 of the motor 8. Having fulfilled its cooling function the water is let off via the vent connection 22 and the subsequent outlet pipe 23, indicated with a stippled line.

The second outlet pipe 5 as well as the outlet pipe 23 can be provided with control valves 24 and 25 to maintain the desired water pressure in the pipes 3, 5 and 6 as well as in the unit 2. In an alternative embodiment the valve 24 and the section of the outlet pipe 5 extending beyond the branch pipe 6 are avoided so that non-purified water is only tapped via the pipe 23. In yet a further embodiment non-purified water is tapped via the pipe 5, and the pipe 23 only acts as an outlet for the cooling water from the motor 8.

Figure 2:
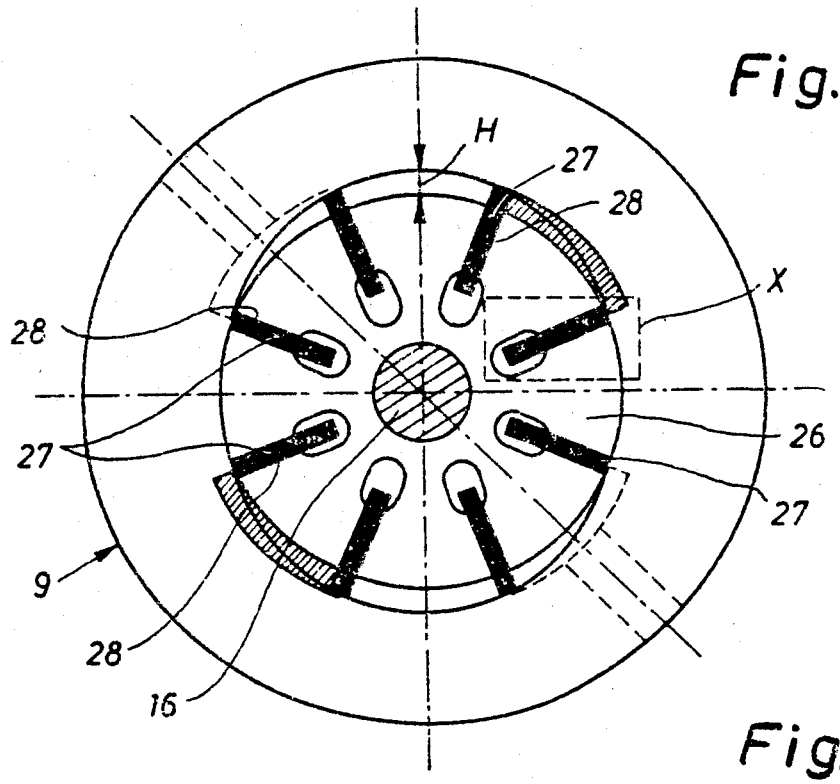
FIG. 2 is a cross-sectional view along the line II—II of FIG. 1.
Figure 3:
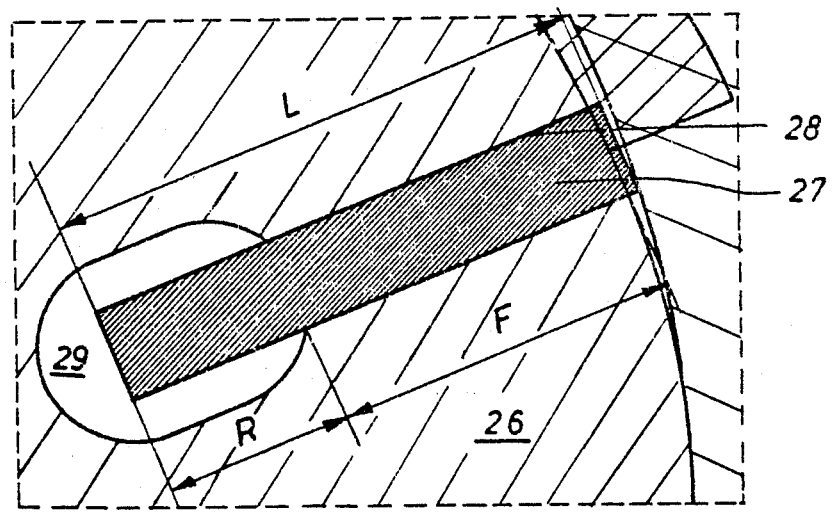
FIG. 3 is a detailed view of X of FIG. 2.

The feed pump 9 is preferably a vane pump substantially known per se, cf. FIG. 2. A rotor 26 of said pump is mounted in a torsionally rigid manner on the common shaft extension 16 and comprises a number of vanes 27 displaceably mounted in slots 28. The length L of a vane 27 is usually 6 to 20 times, preferably 10 to 15 times, the maximum length of stroke H of said vane. The vane 27 has a wear reserve R to ensure an exact guiding in the guide section F of the slot 28 in the rotor 26 during wear. The reserve is formed by the inner end of the slot 28 being provided with a broadened recess 29, the inner end of the vane just projecting into said recess when the vane has reached its extreme position, i.e. when it has been moved outwardly by the maximum length of stroke. The reserve has a maximum value of about 3 to 8 times the maximum length of stroke H of the vane 27.

The above described assembly operates as follows:

Via the inlet pipe 7 and by means of the feed pump 9 driven by the motor 8 the assemlby is charged with an amount of untreated water equal to the amount withdrawn from the assembly because of use. This amount is delivered via the outlet(s) 9a of the pump 9 and at the desired overosmotic pressure to the circulation pump 10. The circulation pump 10 is also fed by the pipes 5 and 6 and delivers water to the circulation pipe 3. One part of the water flowing into the first chamber 13 of the reverse osmosis unit 2 via the pipe 3 permeates the membrane 12, is thus purified and reaches the chamber 14. From there the purified water flows via the first outlet pipe 4 to the desired user location(s). The remaining part of the water not having permeated the membrane 12 is concentrated by a certain amount of impurities retained by the membrane and let to appropriate user location(s) via the second outlet pipe 5. To protect the membrane against premature loading a predetermined amount of water is removed via the branch pipe 6 and fed back to the unit 2 at great velocity via the circulation pump and the pipe 3, said predetermined amount being supplied with additional untreated water from the inlet pipe 7. As a result the impurities filtered by the membrane and clinging thereto are flushed away by the high velocity in a manner known per se.

We claim:

1. An assembly for making up untreated water by removing undesirable materials according to the principle of reverse osmosis, said assembly comprising a driven feed pump fed with untreated water, and a water circuit connected thereto with a driven circulation pump, where the pressure of the delivered untreated water is increased above the osmotic pressure, and a reverse osmosis unit, wherefrom subsequent to the reverse osmosis treatment part of the water is available as pure water whereas the remaining part leaves the reverse osmosis unit in form of concentrated untreated water and is at least partially returned to the circulation pump, wherein the feed pump (9) and the circulation pump (10) are arranged on a common shaft (16) driven by a motor (8).

2. An assembly as in claim 1, wherein the shaft (15) of the motor (8) has an extension (16), and the feed pump (9) and the circulation pump (10) are arranged with no space between each other on said extension (16), the motor being preferably flanged to the housing (17) of the feed pump.

3. An assembly as in claim 1, wherein a part (18) of the housing wall (17) of the first pump (9) constitutes also a part of the housing wall (19) of the other pump (10).

4. An assembly as in claim 1, wherein the feed pump (9) is a displacement pump and the circulation pump (10) is a centrifugal pump.

5. An assembly as in claim 1, wherein the feed pump (9) is a preferably double acting vane pump.

6. An assembly as in claim 5, wherein the ratio of the length (L) of the vane (27) of the vane pump to the value of the maximum length of stroke (H) of said vane is between 6 and 20, preferably between 10 and 15.

7. An assembly as in claim 5, wherein the vanes (27) of the vane pump are provided with a wear reverse (R) with respect to the guide length (F) of the slot (28), said wear reserve being at the most 3 to 8 times the maximum length of stroke (H) of the vane.

8. An assembly as in claim 1, wherein the motor is preferably an electric motor and more preferably a wet motor, for instance a canned motor.

9. An assembly as in claim 1, wherein a fluid path (20) is provided, said path leading to the rotor chamber (21) of the motor (8) for cooling the motor with concentrated water from the reverse osmosis unit (2).

10. An assembly as in claim 9, wherein the cooling water outlet pipe (23) of the motor (8) through which the cooling water leaves the motor is provided with a control valve (25) for adjusting the pressure of the water circuit (2, 3, 5, 6, 10).

11. An assembly as in claim 1, wherein the speed of the motor is adjustable.

* * * * *